June 10, 1930. C. F. JENKINS 1,763,357
ARC LAMP LENS DISK TRANSMITTER
Filed Jan. 3, 1928
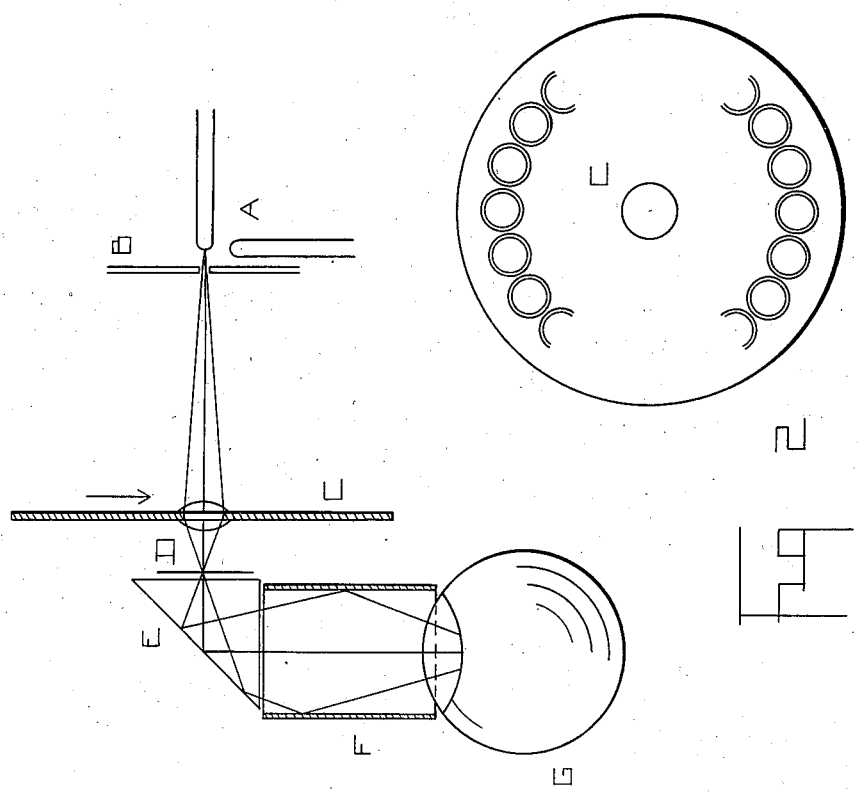
Charles Francis Jenkins, Inventor
Witness:

Patented June 10, 1930

1,763,357

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

ARC-LAMP LENS-DISK TRANSMITTER

Application filed January 3, 1928. Serial No. 244,323.

This invention relates to motion picture transmission, and is a new sequence of the parts shown in applicant's Patents Nos. 1,559,437; 1,695,980; 1,740,352; and application Serial No. 200,751; to produce a new result.

Its object is to greatly increase the current output of the light-sensitive cell.

This object is attained by shifting the usual sequence, or order of succession, of the parts through which the light passes to reach the cell.

In the references cited the sequence is as follows: light source, motion picture film, rotating lens-disk; and light-sensitive cell.

In the present invention the picture film and the lens-disk change places, and the sequence is then: light-source, lens-disk, picture-film, and light-cell.

In such sequence approximately two thousand five hundred times more light falls on the cell, and the current output is in nearly the same ratio, producing an astonishing efficiency where before meager results only were possible.

With these and other objects in view, the invention consists of the new sequence of old parts herein described, illustrated in the drawings, and particularly pointed out in the claims.

In the drawings Figure 1 is a schematic illustration of the arrangement of the several elements, showing the sequence; and Figure 2 an elevation of the lens-disk, with a plurality of lenses thereon.

In the drawings A is a light-source, an arc lamp; B an apertured mask; C a rotatable lens-disk, with but a single lens shown in Figure 1; D a transverse section of a motion-picture film; E a right-angle prism; F a reflecting-walled channel; and G a light-sensitive cell.

The lenses of the lens-disk are so located, with respect to the location of the crater of the arc and the location of the film, that the light is concentrated by the lenses into a very tiny spot on the motion picture film, i. e., a spot the size of the elementary area of the film surface scanned by the movement of the lenses transversely of the film.

Because the light-cell performs best when the greatest possible part of the cell surface is covered, the cell is located at such a distance from the film that the diverging light which has passed through the film may cover the active surface of the cell.

For a like reason a reflecting-walled channel may (if desired) be provided between the film and the cell to conserve any film-diffusion losses of light.

In order that the crater-image on the film may have a very sharp boundary, permitting the scanning of the picture in the greatest possible detail, an apertured mask is located just in front of the arc to cut off flame, and other extraneous illumination.

Because the film is in continuous motion, the whole area of each frame of the motion picture film is covered in successive traverses of the lenses on the disk, with the lenses arranged in a circle. Such a circular arrangement of the lenses insures good dynamic balance, resulting in the necessary high speed of the lens disk without vibration.

The relatively enormous current output from the light-cell, resulting from the new sequence of elements herein set forth, provides such a surplus of current that current-modulation may follow exactly the modulation of light-values in each elementary frame of the whole picture series on the film.

Obviously, the prism, E, might be omitted and the light cell located in a right line with the light-source, the lenses and the film, without departing from the spirit of my invention, for it is the sequence and not the particular direction of alignment which determines the value of this invention.

What I claim, is—

1. In a television system the combination of a light source of high intensity, a continuously moving picture film, a lens disk having the lens arranged equi-distant from the axis thereof, said disk being situated between the light source and the film, and a photo-sensitive cell situated to receive the divergent beam projected through the film by the lens disk.

2. The combination according to claim 1 in which an apertured mask is provided between the light source and the lens disk.

3. The combination according to claim 1 in which a light confining channel is provided between the lens disk and a photo-electric cell.

4. In a television system the method of scanning using a lens disk which comprises projecting light from a high intensity source directly through the lenses on said disk, and then through the elemental areas of a continuously moving picture film, and positioning a photo-sensitive cell in front of said film to receive the divergent rays after they are projected through said film to said lens disk.

In testimony whereof I have affixed my signature.

CHARLES FRANCIS JENKINS.